United States Patent
Yokoi et al.

(10) Patent No.: US 6,880,046 B1
(45) Date of Patent: Apr. 12, 2005

(54) MULTIPROCESSOR SYSTEM AND MEMORY ACCESS METHOD

(75) Inventors: Megumi Yokoi, Kawasaki (JP); Hiroshi Wachi, Kawasaki (JP); Kouichi Odahara, Kawasaki (JP); Toru Watabe, Kawasaki (JP); Hiroshi Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 09/645,880

(22) Filed: Aug. 25, 2000

(30) Foreign Application Priority Data

Dec. 13, 1999 (JP) .......................................... 11-353729

(51) Int. Cl.[7] .......................... G06F 12/08; G06F 13/00
(52) U.S. Cl. ........................ 711/137; 711/158; 710/52; 710/317; 710/244
(58) Field of Search ............................ 711/3, 137–138, 711/150–151, 158, 168, 148, 141, 213; 710/52, 317, 244, 310; 712/11, 16, 28, 207; 709/207, 214, 240–241, 216; 370/362–364, 381, 360, 357, 386–388

(56) References Cited

U.S. PATENT DOCUMENTS

| | | | | | |
|---|---|---|---|---|---|
| 5,603,005 A | * | 2/1997 | Bauman et al. | ............. | 711/124 |
| 5,701,426 A | * | 12/1997 | Ryan | ............................... | 711/3 |
| 5,761,452 A | * | 6/1998 | Hooks et al. | ................ | 710/116 |
| 6,055,650 A | * | 4/2000 | Christie | ........................ | 714/39 |
| 6,067,611 A | * | 5/2000 | Carpenter et al. | ............. | 712/28 |
| 6,263,405 B1 | * | 7/2001 | Irie et al. | ..................... | 711/141 |
| 6,263,415 B1 | * | 7/2001 | Venkitakrishnan | ........... | 712/11 |
| 6,341,336 B1 | * | 1/2002 | Arimilli et al. | .............. | 711/144 |
| 6,341,337 B1 | * | 1/2002 | Pong | ............................. | 711/146 |
| 6,405,289 B1 | * | 6/2002 | Arimilli et al. | .............. | 711/145 |

FOREIGN PATENT DOCUMENTS

| JP | 2-307123 | 12/1990 |
|---|---|---|
| JP | 9-146840 | 6/1997 |

* cited by examiner

Primary Examiner—Denise Tran
(74) Attorney, Agent, or Firm—Staas & Halsey LLP

(57) ABSTRACT

A memory access method is employed in a multiprocessor system which includes a plurality of system modules coupled via a crossbar module, where each of the system modules includes a buffer which holds data and a plurality of processors having a cache memory which temporarily holds data. The memory access method includes a step, responsive to a read request from a processor within an arbitrary system module, holding data preread from a system module other than the arbitrary system module in a buffer within the crossbar module.

17 Claims, 5 Drawing Sheets

MULTIPROCESSOR SYSTEM AND MEMORY ACCESS METHOD

BACKGROUND OF THE INVENTION

This application claims the benefit of a Japanese Patent Application No. 11-353729 filed Dec. 13, 1999, in the Japanese Patent Office, the disclosure of which is hereby incorporated by reference.

1. Field of the Invention

The present invention generally relates to multiprocessor systems and memory access methods, and more particularly to a multiprocessor system which has a plurality of system modules connected via a crossbar module where each system module is mounted with a plurality of processors, and to a memory access method for such a multiprocessor system.

2. Description of the Related Art

In a conventional processor system, when a read request is output from one processor, a data preread access is started with respect to a main memory, simultaneously as an access to a cache memory of this one processor. When the access to the cache memory results in a mishit, the data read from the main memory to a buffer by the data preread access can be used to reduce the memory access time.

In a conventional multiprocessor system, a plurality of processor systems having the structure described above are connected via a bus. Accordingly, when reading the data from the cache memory of the processor, the data is in most cases read via the bus.

As the scale of the multiprocessor system becomes large, the data transfer path becomes extremely long. As a result, simply applying the data preread access of the conventional processor system to such a large-scale multiprocessor system may cause interference of normal data transfer. In addition, the bus may be occupied by the data preread access, to thereby deteriorate the performance of the multiprocessor system as a whole.

On the other hand, in a case where the buffer which holds the preread data is provided at a location distant from the processor which made the read request, it takes time to transfer the preread data to the processor which made the read request. In this case, it is impossible to bring out the advantageous effects of the data preread access.

SUMMARY OF THE INVENTION

Accordingly, it is a general object of the present invention to provide a novel and useful multiprocessor system and memory access method, in which the problems described above are eliminated.

Another and more specific object of the present invention is to provide a multiprocessor system and memory access method which hold preread data at a location which is close as much as possible to a processor which made a read request, so that it is possible to bring out the advantageous effects of the data preread access without interfering with the normal data transfer, to thereby improve the performance of the multiprocessor system as a whole.

Still another object of the present invention is to provide a memory access method for a multiprocessor system which includes a plurality of system modules coupled via a crossbar module, each of the system modules including a buffer which holds data and a plurality of processors having a cache memory which temporarily holds data, comprising a step, responsive to a read request from a processor within an arbitrary system module, holding data preread from a system module other than the arbitrary system module in a buffer within the crossbar module. According to the memory access system of the present invention, it is possible to hold the preread data at a location which is close as much as possible to the processor which made a read request, so that it is possible to bring out the advantageous effects of the data preread access without interfering with the normal data transfer, to thereby improve the performance of the multiprocessor system as a whole.

A further object of the present invention is to provide a multiprocessor system comprising a plurality of system modules, at least one crossbar module, and a bus coupling the system modules and the crossbar module, where each of the system modules includes a buffer which holds data, a plurality of processors each having a cache memory which temporarily holds data, and a control unit which controls input and output of data with respect to the system module to which the control unit belongs, a data transfer between two system modules is made via the crossbar module, and the crossbar module includes a buffer which holds data preread from a system module other than an arbitrary system module in responsive to a read request from a processor within the arbitrary system module. According to the multiprocessor system of the present invention, it is possible to hold the preread data at a location which is close as much as possible to the processor which made a read request, so that it is possible to bring out the advantageous effects of the data preread access without interfering with the normal data transfer, to thereby improve the performance of the multiprocessor system as a whole.

Another object of the present invention is to provide a multiprocessor system comprising a plurality of nodes each including a plurality of system modules, a crossbar module, and a bus coupling the system modules and the crossbar module within each node, and a bus coupling adjacent nodes via the crossbar modules of the adjacent nodes, where each of the system modules includes a buffer which holds data, a plurality of processors each having a cache memory which temporarily holds data, and a control unit which controls input and output of data with respect to the system module to which the control unit belongs, a data transfer between two system modules is made via at least one crossbar module, and the crossbar module includes a buffer which holds data preread from a system module other than an arbitrary system module in responsive to a read request from a processor within the arbitrary system module. According to the multiprocessor system of the present invention, it is possible to hold the preread data at a location which is close as much as possible to the processor which made a read request, so that it is possible to bring out the advantageous effects of the data preread access without interfering with the normal data transfer, to thereby improve the performance of the multiprocessor system as a whole.

It is possible to set information indicating whether or not to carry out a data preread with respect to the arbitrary system module, depending on a program which is executed by one or a plurality of processors within the arbitrary system module. In other words, the information indicating whether or not to carry out the data preread, may be set for each processor, or set with respect to a plurality of processors within one system module but less than all of the processors within the one system module.

Other objects and further features of the present invention will be apparent from the following detailed description when read in conjunction with the accompanying drawings.

DESCRIPTION OF THE PREFERRED EMBODIMENTS

Figure 1:
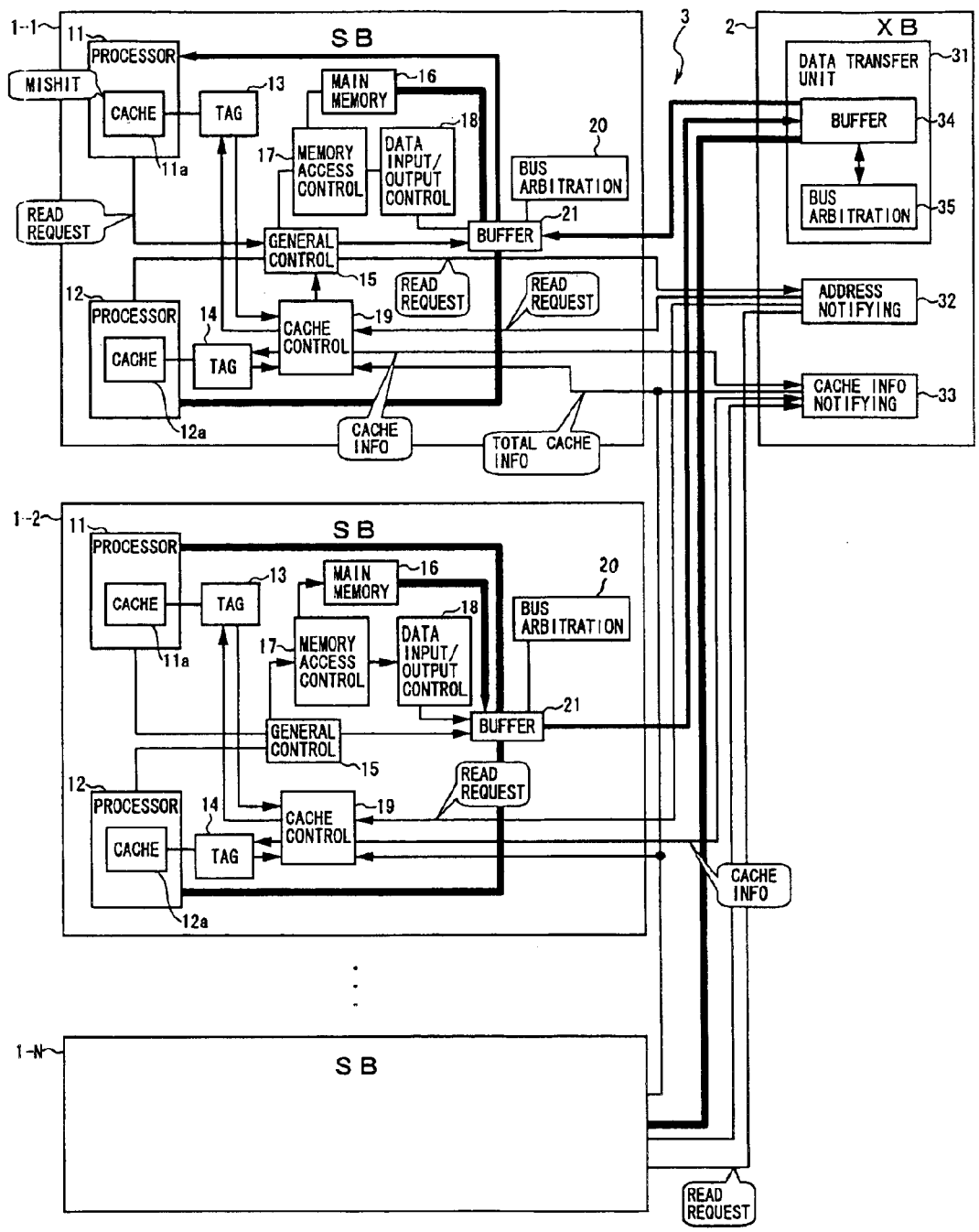
FIG. 1 is a system block diagram showing a first embodiment of a multiprocessor system according to the present invention.

A description will be given of embodiments of a multiprocessor system according to the present invention and a memory access method according to the present invention, by referring to the drawings.

FIG. 1 is a system block diagram showing a first embodiment of the multiprocessor system according to the present invention. This first embodiment of the multiprocessor system employs a first embodiment of the memory access method according to the present invention.

In FIG. 1, the multiprocessor system generally includes a plurality of system modules (or SBs: System Boards) 1-1 through 1-N, a crossbar module (or XB: Crossbar Board) 2, and a bus 3 which connects the system modules 1-1 through 1-N and the crossbar module 2. The system modules 1-1 through 1-N have the same structure, and N is an integer greater than or equal to two. It is assumed for the sake of convenience that each of the system modules 1-1 through 1-N has two processors, but each system module may of course have three or more processors.

Each of the system modules 1-1 through 1-N has a processor 11 which is made up of a CPU including a cache memory 11a and the like, a processor 12 which is made up of a CPU including a cache memory 12a, a tag 13 for the cache memory 11a, a tag 14 for the cache memory 12a, a general control circuit 15, a main memory 16, a memory access control unit 17, a data input and output control unit 18, a cache information control unit 19, a bus arbitration unit 20, and a data holding buffer 21.

On the other hand, the crossbar module 2 has a data transfer unit 31, an address notifying unit 32, and a cache information notifying unit 33. The data transfer unit 31 includes a data holding in buffer 34 and a bus arbitration unit 35. The crossbar module 2 has a function of selecting or merging information received from each of the system modules 1-1 through 1-N, and returning the information to each of the system modules 1-1 through 1-N via the bus 3.

A procedure for a normal read process is as follows, as indicated by ①, ②, ③ and ④. ① A read request which is issued from a certain system module is supplied to each of the system modules 1-1 through 1-N from the crossbar module 2 via the bus 3. ② All of the system modules 1-1 through 1-N supply cache information which indicates a state of the cache memory to the crossbar module ③ The crossbar module 2 supplies to each of the system modules 1-1 through 1-N the cache information which is selected or merged by the crossbar module 2. ① If valid data does not exist in the cache memory of any of the system modules 1-1 through 1-N, that is, if the information in the main memory 16 is the most recent data, a system module which has the memory with a target address starts an access to the main memory 16, to carry out a data transfer.

In each of the system modules 1-1 through 1-N, circuit parts excluding the processors 11 and 12, the main memory 16 and the like, may be formed by a single large scale integrated (LSI) circuit or by a plurality of LSI circuits.

Next, a description will be given of the operation of this embodiment. When a mishit is generated in the processor 11 within the system module 1-1, the processor 11 issues a read request to the general control circuit 15 within the system module 1-1. In response to this request, the general control circuit 15 within the system module 1-1 transfers the read request to all of the system modules 1-1 through 1-N via the bus 3.

In each of the system modules 1-1 through 1-N to which the read request is transferred, the read request is supplied to the general control circuit 15 via the cache information control unit 19. In other words, the read request is transferred to all of the system modules 1-1 through 1-N, including the request source of the read request. The cache information control unit 19 checks the tags 13 and 14 of the corresponding cache memories 11a and 12a, and outputs tag information via the bus 3 to the cache information notifying unit 33 within the crossbar module 2. In addition, the general control circuit 15 judges whether or not an address requested by the read request, that is, a requested address, is the address within the system module to which this general control circuit 15 belongs. If the requested address is the address within the system module to which this general control circuit 15 belongs, the memory access control unit 17 within this system module starts an access to the main memory 16 within this system module.

For the sake of convenience, FIG. 1 shows a case where the system module 1-2 has the memory with the address which is requested by the read request of the process 11 within the system module 1-1. Accordingly, in the system module 1-2 which receives the read request, the general control circuit 15 judges that the memory with the requested address is the main memory 16 within the system module 1-2. In addition, in the system module 1-2, the cache information control unit 19 checks the tags 13 and 14 of the corresponding cache memories 11a and 12a, and outputs the tag information via the bus 3 to the cache information notifying unit 33 within the crossbar module 2. Furthermore, in the system module 1-2 in this state, the general control circuit 15 starts the memory access control unit 17, before being notified of the tag information of the cache memories 11a and 12a from the cache information control unit 19, and the memory access control unit 17 attempts to start an access to the main memory 16 by a data preread.

Moreover, in the system module 1-2, the memory access control unit 17 stars the data input and output control unit 18, and the data input and output control unit 18 prepares the data holding buffer 21. Hence, the data at the requested address of the read request is transferred from the main memory 16 to the data holding buffer 21. If the access to the main memory 16 cannot be started due to an access made from a module other than the system module 1-2, the memory access control unit 17 continues the access to the main memory 16 until the access can be started.

In the system module 1-2, the general control circuit 15 interrupts the data preread access of the memory access control unit 17 when notified of the tag information of the cache memories 11a and 12a from the cache information control unit 19, and checks the tag information, that is, analyzes the tag information. The general control circuit 15 restarts the memory access control unit 17 only when the requested address is not found in all of the cache memories 11a and 12a within the system module 1-2. The memory access control unit 17 resumes the access to the main memory 16 when restarted.

In the system module 1-2, the data transferred to the data holding buffer 21 from the main memory 16 is finally transferred to the data holding buffer 21 within the system module 1-1 to ai which the processor 11 which issued the read request belongs.

More particularly, in the system module 12, the bus arbitration unit 20 carries out an arbitration of the bus 3, by lowering a priority of the data which is read by the data preread access and is held within the data holding buffer 21 as compared to a priority of the normal data transfer, so as not to interfere with the use of the bus 3 for the purpose of carrying out the normal data transfer. In the arbitration of the bus 3 carried out by the bus arbitration unit 20 which belongs to a system module 1-i (i=1, . . . N), the bus arbitration unit 20 decides which one of the processors within this system module 1-i is to output the request, that is, which processor request is to be output. When the bus arbitration unit 20 acquires the right to use the bus 3, the preread data is output to the data holding buffer 34 within the data transfer unit 31 of the crossbar module 2.

The preread data is temporarily held in the data holding buffer 34 of the crossbar module 2, and the bus arbitration unit 35 of the crossbar module 2 carries out an arbitration of the bus 3, by lowering a priority of the preread data which is held within the data holding buffer 34 as compared to the priority of the normal data transfer, so as not to interfere with the use of the bus 3 for the purpose of carrying out the normal data transfer. In the arbitration of the bus 3 carried out by the bus arbitration unit 35 which belongs to the crossbar module 2, the bus arbitration unit 35 decides which one of the requests from the system modules 1-1 through 1-N is to be selected. When the bus arbitration unit 35 acquires the right to use the bus 3, the preread data is output to the data holding buffer 21 within the system module 1-1 to which the processor 11 which issued the read request belongs. Therefore, the preread data is temporarily held in the data holding buffer 21 within the system module 1-1.

For example, the preread data may be added with a preread data flag which indicates that the data is a preread data. By using this preread data flag, the bus arbitration units 20 and 35 can judge whether or not to lower the priority of the data transfer.

The cache information related to the cache memories 11a and 12a and output from each of the system modules 1-1 through 1-N, is collected at the cache information notifying unit 33 within the crossbar unit 2, and all of the collected cache information (hereinafter referred to as total cache information) is transferred to each of the system modules 1-1 through 1-N. At a point in time when it is judged based on the total cache information that the data preread failed, the preread data within each of the data holding buffers 21 and 34 are discarded. In addition, at a point in time when it is judged that the data preread was successful, the preread data is regarded as being a valid data, and the process is continued by raising the priority of the preread data to the same priority as the normal data transfer.

The judgement based on the total cache information and a notification of the judgement result may be carried out at each of the system modules 1-1 through 1-N and the crossbar module 2. Alternatively, the judgement based on the total cache information and the notification of the judgement result may be carried out collectively at one of the system modules 1-1 through 1-N and the crossbar module 2. In a case where the crossbar module 2 carries out the judgement based on the total cache information and the notification of the judgement result, the cache information notifying unit 33 may notify the total cache information within the crossbar module 2 or, a control signal may be output to the data holding buffer 34 within the crossbar module 2 from each of the system modules 1-1 through 1-N.

Accordingly, it is possible to start the data preread at an early timing, and to transfer the preread data without interfering with the use of the bus 3 for the purpose of carrying out the normal data transfer. In addition, it is possible to quickly read the preread data into the processor when the data preread is successful. Thus, it is possible to fully bring out the original advantageous effects of data preread in the multiprocessor system.

Figure 2:
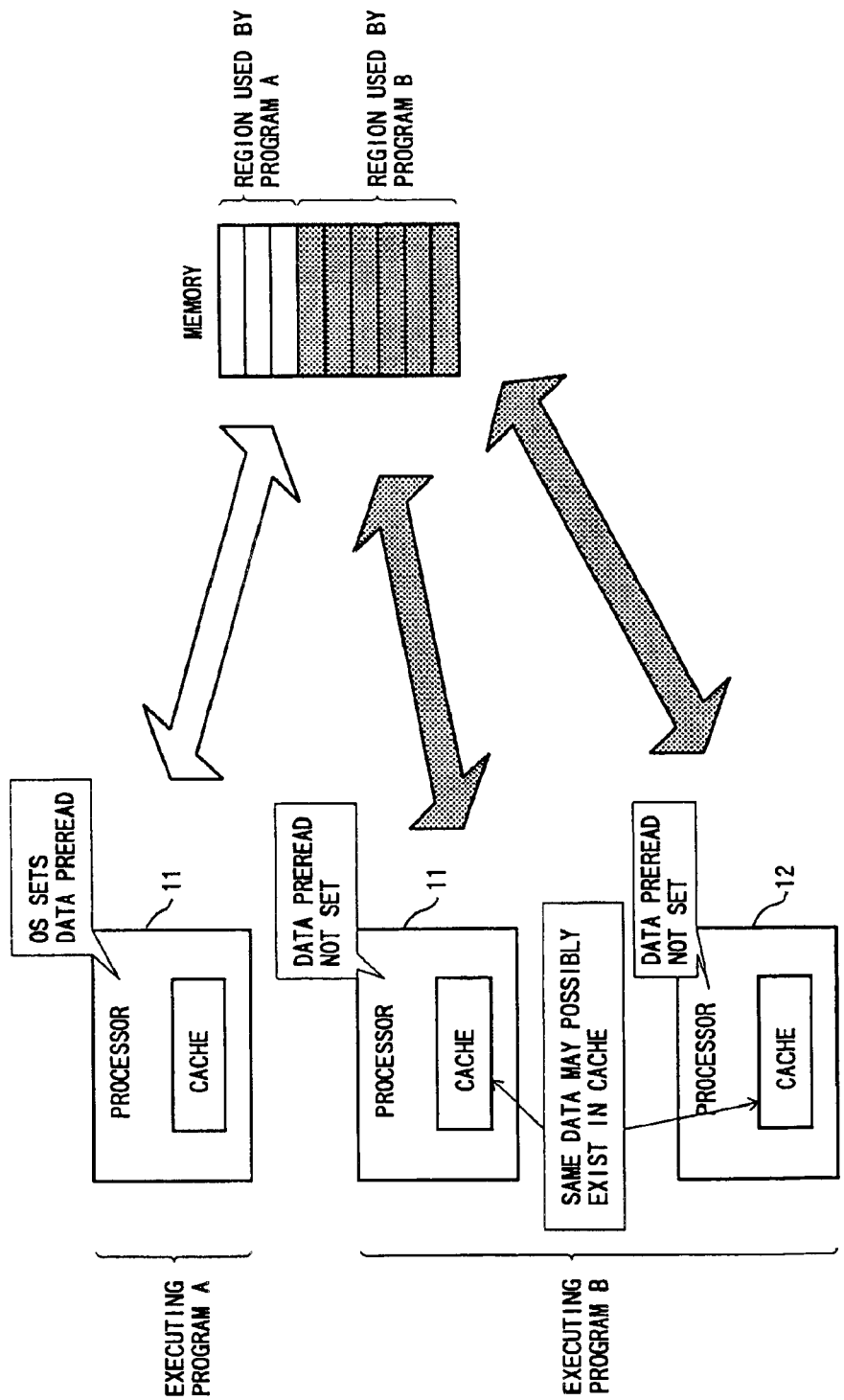
FIG. 2 is a diagram for explaining a setting to determine whether or not to carry out a data preread.

Next, a description will be given of a setting to determine whether or not to carry out the data preread, by referring to FIG. 2. FIG. 2 is a diagram for explaining the setting to determine whether or not to carry out the data preread.

In this embodiment, the setting to determine whether or not to carry out the data preread, is carried out by setting the registers within each of the processors 11 and 12, for example. The registers within each of the processors 11 and 12 can be set depending on the program, by judging the program which is to be executed by each of the processors 11 and 12 by the Operating System (OS). Of course, the register which is set does not necessarily have to be provided within the processor, and any register within the system module provided on a 1:1 basis with the processor may be used. Furthermore, when making the same setting with respect to all of the processors instead of independently setting whether or not to carry out the data preread for each processor, it is of course unnecessary to provide a register for each processor.

In other words, the OS decides which one of the processors 11 and 12 within which one of the system modules 1-1 through 1-N is to execute the program. Hence, the register setting described above can be carried out when the OS decides the processor 11 or 12 which is to execute the program.

In a state indicated at the top portion of FIG. 2, a program A which uses a certain data group is executed only by one processor 11 within a certain system module. The other processor 12 within this certain system module and all of the processors 11 and 12 within the other system modules are in a sleep state or executing a program completely unrelated to the program A. Hence, in such a case, the possibility that the data used by the program A exists within one of the cache memory 12a of the other processor 12 within this certain system module and the cache memories 11a and 12a of all of the processors 11 and 12 within the other system modules is extremely low. In other words, the probability that the data preread succeeds is extremely high. For this reason, the OS in such a case sets the register corresponding to each of the processors 11 and 12 within each of the system modules to indicate that the data preread is required. If the register is provided on a 1:1 basis with he processor, it is sufficient to set the data preread in only the register corresponding to the processor which is running the program A. Information indicating whether or not to carry out the data preread is added to the instruction depending on the setting of each register.

On the other hand, in a state indicated at the lower portion of FIG. 2, one program B is executed by the processors 11 and 12 within one or a plurality of system modules or, data of a database is shared and used by a plurality of processors 11 and 12. In such a case, the possibility that the data to be used exists in the cache memories 11a and 12a with the other processors 11 and 12 is high. Hence, the OS in such a case sets the register corresponding to each of the processors 11 and 12 within each of the system modules to indicate that the data preread is not required.

Depending on the setting of the registers corresponding to the processors 11 and 12, the transfer of the preread data and the normal data transfer are distinguished, and the priority of the preread data is set lower than the priority of the normal data transfer. For example, with respect to a read request which is issued from a processor having a corresponding register which is set to indicate that the data preread is required, information which indicates "data preread required" is added. When making the memory access, it is possible to carry out the data transfer by lowering the priority of the data preread as compared to the priority of the normal memory access, based on this information. In addition, by also adding similar information to the preread data, it is possible to carry out the data transfer by lowering the priority of the preread data as compared to the priority of the normal data transfer, based on this similar information. Accordingly, the bus arbitration units 20 and 35 can determine the right to use the bus 3 based on the information added to the data and the request. The information which indicates whether or not to carry out the data preread may be added to the data and the request in the form of a data preread flag, for example.

Figure 3:
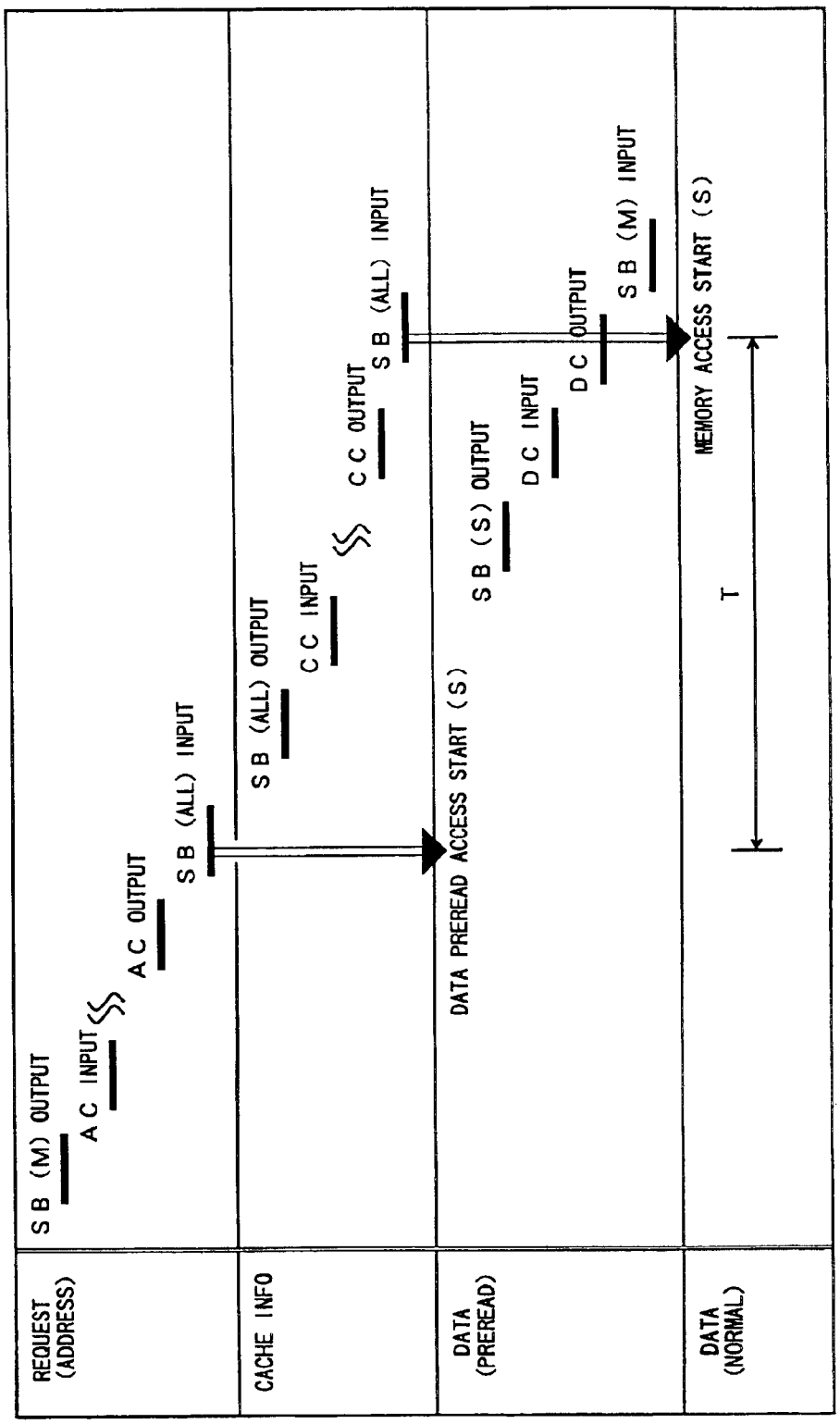
FIG. 3 is a diagram for explaining an operation timing of the first embodiment of the multiprocessor system.

FIG. 3 is a diagram for explaining the operation timing of this first embodiment of the multiprocessor system. In FIG. 3. (M) indicates the system module 1-1 which issued the read request, (S) indicates the system module 1-2 which has the memory with the requested address, and (ALL) indicates all of the system modules 1-1 through 1-N, AC indicates the address notifying unit 32 of the crossbar module 2, CC indicates the cache information notifying unit 33 of the crossbar module 2, and DC indicates the data transfer unit 31 of the crossbar module 2. As may be seen from FIG. 3, a time difference T exists between a case where the data preread is executed and a case where no data preread is executed.

Independent registers, that is, a first register and a second register may be provided with respect to each of the processor 11 and 12, with respect to a mode in which the memory read is started at a timing when the address notified from the address notifying unit 32 of the crossbar module 2 reaches each of the system modules 1-1 through 1-N, and a mode in which the memory read is started after the cache state within each of the system modules 11 through 1-N is read and confirmed.

In this case, if the setting is valid for both the first and second registers, the data preread access is started when the address reaches each of the system modules 1-1 through 1-N. If the cache information is read before the data preread access can be started, the cache information is confirmed before restarting the memory access. On the other hand, if the data preread access cannot be started when the address reaches each of the system modules 1-1 through 1-N, the memory access is repeated until the data preread access can be started. In addition, if the memory access cannot be restarted after confirming the cache information, the memory access is also repeated until the memory access can be started.

Normally, the setting is not made valid for only one of the first and second registers. However, the setting condition may be determined as follows. In other words, it is possible to define the setting condition so that, when the setting is made valid for only the first register and the cache information is read by the time the data preread access is successfully started, the data preread access is interrupted at this point in time. On the other hand, it is possible to define the setting condition so that, when the setting is made valid for only the second register, the cache information is read and confirmed before the data preread access is started. By investigating the performance of the actual multiprocessor system by carrying out a test, it is possible to know how the first and second registers may be set in order to bring out the performance of the multiprocessor system to a maximum.

Figure 4:
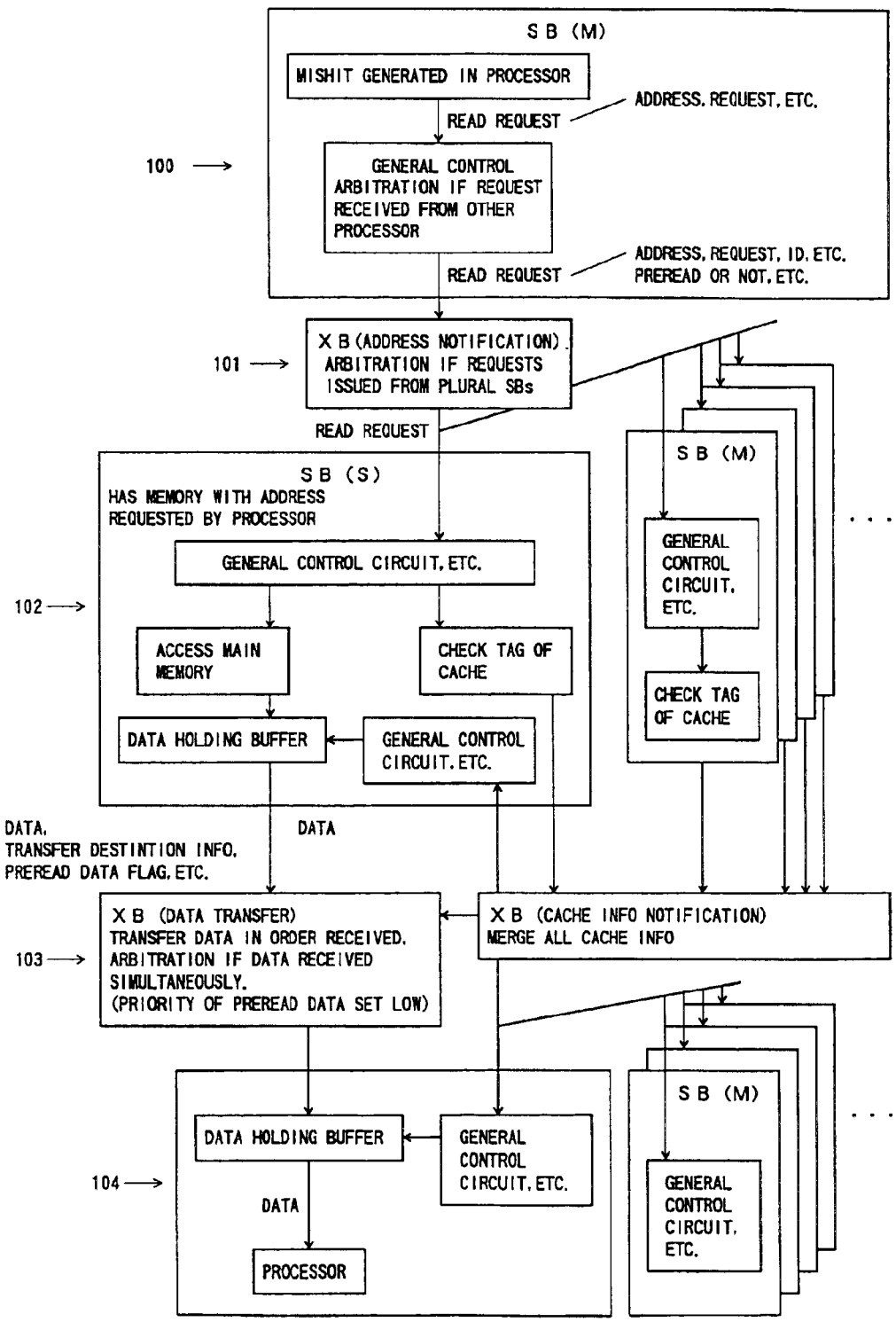
FIG. 4 is a flow chart for explaining the general operation of the first embodiment.

FIG. 4 is a flow chart for explaining the general operation of this first embodiment of the multiprocessor system. In FIG. 4, (M) indicates the system module 1-1 which made the read request, (S) indicates the system module 1-2 which has the memory with the requested address, and XB indicates the crossbar module 2.

In FIG. 4, in a step 100, a read request which includes the address, request and the like is issued when a mishit is generated in the processor within the system module 1-1. In addition, the general control circuit 15 of the system module 1-1 carries out an arbitration if requests are issued from other processors within the system module 1-1. Hence, the general control circuit 15 outputs an identification (ID) of the processor which issued the read request including the address, request and the like, and a read request which includes whether or not to carry out the data preread, with respect to the crossbar module 2.

In a step 101, the crossbar module 2 makes an address notification, and carries out an arbitration if requests are issued from a plurality of system modules.

In a step 102, each system module checks the tag information of the cache memories, judges whether each system module has the memory with the requested address of the read request, and sends the cache information to the crossbar module 2. In addition, in the system module 1-2, the preread data which is read by accessing the main memory 16 is held in the data holding buffer 21. The preread data within the data holding buffer 21 is transferred to the crossbar module 2 together with transfer destination information which is the ID of the processor which issued the read request within the system module 1-1, the preread data flag and the like. In other words, the step 102 carries out two processes, namely, a process of checking whether or not the requested address exists within the main memory 16, and a process of detecting the state of the cache memory by checking the tag information. In this state, the system module 1-2 has the memory with the requested address.

In a step 103, the crossbar module 2 temporarily holds the data received from the system modules in the order received, and outputs the data with respect to the system module 1-1. If the data are simultaneously received from a plurality of system modules, an arbitration is carried out in the crossbar module 2. Furthermore, the priority of the preread data is set lower than the priority of the normal data transfer. The crossbar module 2 selects or merges the cache information received from all of the system modules, and notifies the cache information to each of the system modules.

In a step 104, if the data preread is successful, the preread data from the crossbar module 2 is held in the data holding buffer 21 within the system module 1-1, and enables the process which issued the read request to read the preread data.

Therefore, this first embodiment carries out the data preread based on the read request according to the following procedure.

Step S1: In the multiprocessor system described above, the system module 1-2 which has the memory with the requested address starts the read access before the cache information indicating the state of all of the cache memories is obtained, that is, starts the data preread.

Step S2: When carrying out the step S1, the preread data is held at an intermediate portion of a transfer path. As will be described later, the intermediate portion of the transfer path includes the data holding buffer 21 within the system module 1-2 which has the memory with the requested address of the read request, and the data holding buffer 21 within the system module 1-1 which issued the read request.

Step S3: Based on the cache information from each of the system modules 1-1 through 1-N collected by the crossbar module 2, the data transfer is continued after confirming that the preread data held in the intermediate portion of the transfer path is valid.

Step S4: The system module 1-2 which has the memory with the requested address starts the data preread regardless of the contents of the cache memory within this system module 1-2 or, starts the data preread after confirming the contents of the cache memory within the system module 1-2.

Step S5: In a case where the data preread cannot be started, the step S3 or the step S4 described above is repeated at least once. A flag is set so that the step S3 and the step S4 will not be carried out simultaneously. As described above, the information indicating whether or not to carry out the data preread is set depending on the program to be executed by the processor, in the register corresponding to this processor.

In the large-scale multiprocessor system, it is important that the data required by the processor which issued the read request is transferred to a location close as much as possible to this processor. It is also important that the data preread is started at an earliest possible timing. Hence, this embodiment provides the buffer at the intermediate portion of the data transfer-path, and the bus arbitration is carried out by setting the priority of the preread data transfer lower than the priority of the normal data transfer, so as not to interfere with the normal data transfer. Furthermore, the preread data is successively transferred on the data transfer path, and gradually transferred-closer to the processor which issued the read request.

On the other hand, the start timing of the data preread is set to a timing after the address is notified to all of the system modules 1-1 through 1N and immediately after this address is received by the system modules 1-1 through 1-N. In other words, the start timing of the data preread is set to the same timing at which the tag information indicating the state of the cache memory within the system modules 1-1 through 1-N is checked. Hence, it is possible to start the data preread at an extremely early timing. In addition, depending on the traffic of the memory access made from other modules, the start of the data preread is repeated if the data preread cannot be started at the timing described above. Moreover, if the checking of the tag information of the cache memory ends before the data preread is accepted by the memory, a judgement is made based on the tag information to determine whether or not the data exists in the cache memory within the system modules 1-1 through 1-N, and the start of the data preread is repeated if the data does not exist in the cache memory within the system modules 1-1 through 1-N.

Figure 5:
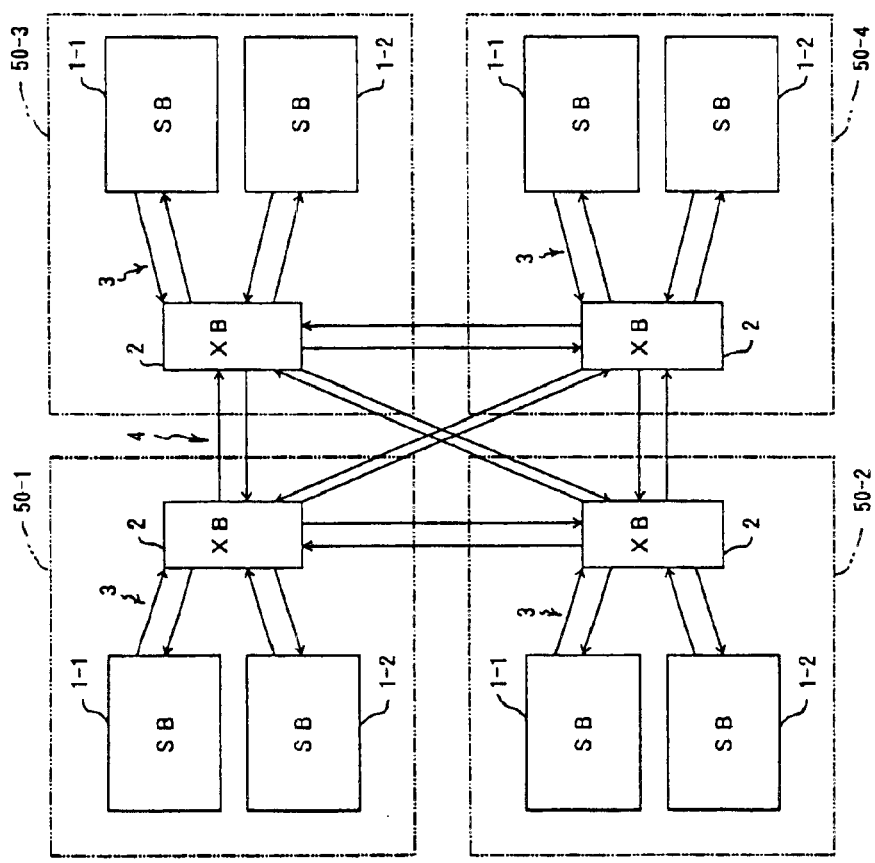
FIG. 5 is a system block diagram showing a second embodiment of the multiprocessor system according to the present invention.

Next, a description will be given of a second embodiment of the multiprocessor system according to the present invention. FIG. 5 is a system block diagram showing the second embodiment of the multiprocessor system. This second embodiment of the multiprocessor system employs a second embodiment of the memory access method according to the present invention.

In FIG. 5, the multiprocessor system includes a plurality of nodes 50-1 through 50-4. Each of the nodes 50-1 through 50-4 includes a plurality of system modules 1-1 and 1-2, a crossbar module 2, and a bus 3 which connects the system modules 1-1 and 1-2 and the crossbar module 2. The system modules 1-1 and 1-2, the crossbar module 2, and the bus have the same structure as those corresponding parts of the first embodiment described above. The crossbar modules 2 of adjacent nodes are connected by a bus 4.

Of course, the number of nodes is not limited to four, and the number of system modules within each node is not limited to two.

In this second embodiment, the data preread may be carried out within one node or, the data preread may be carried out over a plurality of nodes. In the first case, the operation is the same as that of the first embodiment described above. In the second latter case, the operation is carried out in the following manner.

For example, if a read request is issued from the system module 1-1 within the node 50-1, and the memory with the requested address is located in the system module 1-2 within the adjacent node 50-2, the preread data is transferred from the system module 1-2 within the node 50-2 to the system module 1-1 within the node 50-1 at the request source, successively via the crossbar module 2 within the node 50-2, the bus 4, and the crossbar module 2 within the node 50-1. Therefore, this second embodiment can also hold the preread data at a location which is close as much as possible to the processor which issued the read request.

Further, the present invention is not limited to these embodiments, but various variations and modifications may be made without departing from the scope of the present invention.

What is claimed is:

1. A memory access method for a multiprocessor system which includes a plurality of system modules coupled via a crossbar module, each of the system modules including a buffer which holds data and a plurality of processors having a cache memory which temporarily holds the data, said memory access method comprising:

responsive to a read request from a processor within an arbitrary system module, holding data preread from one of the system modules, other than the arbitrary system module, in a buffer within the crossbar module; and transferring the preread data from the one of the system modules, other than the arbitrary system module, to the buffer within the crossbar module, with a priority lower than a priority of a normal data transfer between the system modules and the crossbar module.

2. The memory access method as claimed in claim 1, further comprising:

setting information indicating whether or not to carry out a data preread with respect to the arbitrary system module, depending on a program which is executed by one or a plurality of processors within the arbitrary system module.

3. The memory access method as claimed in claim 2, further comprising:

adding, to a data transfer of the preread data, the priority which is lower than the priority of the normal data transfer.

4. The memory access method as claimed in claim 1, further comprising:

adding, to a data transfer of the preread data, the priority which is lower than the priority of the normal data transfer.

5. The memory access method as claimed in claim 1, wherein said holding data further comprises:

generating the read request from the arbitrary system module if a mishit occurs in the arbitrary system module; and prereading the data requested by the read request in the system module, other than the arbitrary system module, and storing the requested data.

6. The memory access method as claimed in claim 5, further comprising:

transferring the preread data stored in the buffer within the crossbar module to the arbitrary system module with a priority lower than the priority of the normal data transfer between the system modules and the crossbar module.

7. A multiprocessor system, comprising:

a plurality of system modules;

at least one crossbar module; and a bus coupling the system modules and the crossbar module;

each of the system modules including a buffer which holds data, a plurality of processors each having a cache memory which temporarily holds the data, and a control unit which controls input and output of the data with respect to the system module to which the control unit belongs, a data transfer between two of the system modules being made via the crossbar module, said crossbar module including a buffer which holds data preread from one of the system modules, other than an arbitrary system module, responsive to a read request from a processor within the arbitrary system module, and said one of the system modules transferring the preread data from the one of the system modules, other than the arbitrary system module, to the buffer within the crossbar module, with a priority lower than a priority of a normal data transfer between the system modules and the crossbar module.

8. The multiprocessor system as claimed in claim 7 wherein the arbitrary system module includes a unit setting information indicating whether or not to carry out a data preread with respect to the arbitrary system module, depending on a program which is executed by one or a plurality of processors within the arbitrary system module.

9. The multiprocessor system as claimed in claim 8, wherein each of the system modules further includes a unit adding, to a data transfer of the preread data, the priority which is lower than the priority of the normal data transfer.

10. The multiprocessor system as claimed in claim 7 wherein each of the system modules further includes a unit adding, to a data transfer of the preread data, the priority which is lower than the priority of the normal data transfer.

11. The multiprocessor system as claimed in claim 7, wherein one of the system modules, which has a memory with a requested address of the read request, includes a unit starting a data preread at a timing before detecting a state of the cache memory included therein.

12. The multiprocessor system as claimed in claim 7, wherein:

the plurality of system modules, the crossbar module, and the bus form a node; and a plurality of nodes are coupled via the crossbar module of adjacent nodes.

13. The multiprocessor system as claimed in claim 7, wherein:

the arbitrary system module generates the read request if a mishit occurs in the arbitrary system module;

the system module, other than the arbitrary system module, storing the data requested by the read request prereads the requested data; and the system module, other than the arbitrary system module, transfers the preread data to the buffer within the crossbar module, with the priority lower than the priority of the normal data transfer between the system modules and the crossbar module.

14. The multiprocessor system as claimed in claim 13 wherein the crossbar module transfers the preread data stored in the buffer thereof to the arbitrary system module with the priority lower than the priority of the normal data transfer between the system modules and the crossbar module.

15. A multiprocessor system, comprising:

a plurality of nodes each including a plurality of system modules, a crossbar module, and a bus coupling the system modules and the crossbar module within each node; and a bus coupling adjacent nodes via the crossbar modules of the adjacent nodes, each of the system modules including a buffer which holds data, a plurality of processors each having a cache memory which temporarily holds the data, and a control unit which controls input and output of the data with respect to the system module to which the control unit belongs, a data transfer between two of the system modules being made via at least one crossbar module, said at least one crossbar module including a buffer which holds data preread from one of the system modules, other than an arbitrary system module, responsive to a read request from a processor within the arbitrary system module, and said one of the system modules transferring the preread data from the one of the system modules, other than the arbitrary system module, to the buffer within said at least one crossbar module, with a priority lower than a priority of a normal data transfer between the system modules and said at least one crossbar module.

16. The multiprocessor system as claimed in claim 15, wherein:

the arbitrary system module generates the read request if a mishit occurs in the arbitrary system module; and the system module, other than the arbitrary system module, storing the data requested by the read request prereads the requested data.

17. The memory access method as claimed in claim 16, wherein the crossbar module transfers the preread data stored in the buffer thereof to the arbitrary system module with the priority lower than the priority of the normal data transfer between the system modules and the crossbar module.

* * * * *

UNITED STATES PATENT AND TRADEMARK OFFICE
CERTIFICATE OF CORRECTION

PATENT NO. : 6,880,046 B1
DATED : April 12, 2005
INVENTOR(S) : Megumi Yokoi et al.

It is certified that error appears in the above-identified patent and that said Letters Patent is hereby corrected as shown below:

Column 11,
Line 20, change ";" to -- , --;
Lines 40 and 50, after "claim 7" insert -- , --;

Column 12,
Line 17, after "claim 13" insert -- , --.

Signed and Sealed this

Twenty-fourth Day of January, 2006

JON W. DUDAS
*Director of the United States Patent and Trademark Office*